United States Patent [19]

Keller

[11] Patent Number: 5,649,685

[45] Date of Patent: Jul. 22, 1997

[54] EXHAUST MUFFLER BRACKET APPARATUS

[75] Inventor: Russell D. Keller, Portland, Oreg.

[73] Assignee: R & D Corporation, Portland, Oreg.

[21] Appl. No.: 293,146

[22] Filed: Aug. 19, 1994

[51] Int. Cl.$^6$ .................................................. F16M 1/00
[52] U.S. Cl. ........................... 248/638; 248/567; 248/610
[58] Field of Search ............................... 248/60, 62, 610, 248/609, 567, 638, 635, 74.4, 282.2, 316.6; 180/309, 296, 89.2

[56] References Cited

U.S. PATENT DOCUMENTS

| | | | |
|---|---|---|---|
| 2,772,126 | 11/1956 | Guy | 248/60 X |
| 2,905,417 | 9/1959 | Grabe | 248/60 |
| 4,063,700 | 12/1977 | Brewer | 248/62 |
| 4,339,919 | 7/1982 | Jobling et al. | 248/610 X |
| 4,465,252 | 8/1984 | Donovan, Jr. et al. | 248/60 |
| 4,746,104 | 5/1988 | Probst | 248/60 X |
| 4,893,778 | 1/1990 | Drabling et al. | 248/60 X |
| 5,197,698 | 3/1993 | Bartholomew | 248/60 |

OTHER PUBLICATIONS

Figure 7 of the Drawings of U.S. Patent Application Serial No. 08/293,146, filed Aug. 19, 1994 of Russell D. Keller (present application).

Primary Examiner—Leslie A. Braun
Assistant Examiner—Gwendolyn W. Baxter
Attorney, Agent, or Firm—Klarquist Sparkman Campbell Leigh & Whinston, LLP

[57] ABSTRACT

An exhaust muffler support apparatus is disclosed including a bracket assembly for clamping at least one end of the muffler to an exhaust pipe and a vehicle mount for mounting the bracket assembly on the vehicle, such as a truck cab. The vehicle mount includes a mounting plate and a pair of tab members formed integral therewith and extending laterally thereto for supporting a mounting shaft. A support arm having one end pivotally attached to the mounting shaft and its other end pivotally connected by a connector shaft to the muffler bracket assembly enables the bracket assembly to pivot about the two axes of such shafts. A shock absorber sleeve of elastomer surrounds the mounting shaft to reduce vibration and noise and to extend the life of the muffler support apparatus. Each bracket assembly includes two pairs of clamp members which are urged together by threaded bolts. One pair of clamp members is of greater length than the other and they are assembled in a nested relationship to provide four contacts between the muffler connector and the exhaust pipe and spaced longitudinally along the exhaust pipe for a stronger connection.

21 Claims, 5 Drawing Sheets

EXHAUST MUFFLER BRACKET APPARATUS

BACKGROUND OF THE INVENTION

The subject matter of the present invention relates generally to exhaust muffler support apparatus and in particular to a vehicle engine exhaust muffler bracket apparatus for a truck, automobile or other vehicle. The exhaust muffler bracket assembly of the present invention includes a bracket for clamping at least one end of a muffler to an engine exhaust pipe, with a pair of clamp members which are pivotally connected by a pivot connection to one end of a support arm to enable the clamp members to pivot relative to the support arm. A vehicle mount, including a mounting plate and a pair of integral tab members extending laterally therefrom, is used for attaching the bracket apparatus to the vehicle and pivotally mounting the other end of the support arm on a mounting shaft extending between the tab members which allows the support arm to pivot relative to the vehicle body. The pivot connections of the support arm to the bracket and to the vehicle mount prevent the exhaust pipe to muffler connection from breaking due to the motion of the muffler relative to the vehicle as it travels along the roadway. In addition, the pivotal mount may be provided with a shock absorber sleeve of elastomer material which surrounds the mounting shaft about which the support arm pivots thereby reducing the amount of vibration transmitted from the truck to the exhaust pipe muffler connection. The exhaust muffler support apparatus of the present invention is especially useful in mounting exhaust mufflers on trucks to provide a long lifetime and to prevent vibration of the muffler and damage which may result therefrom as well as reducing any noise caused by such vibration.

Previously it was common practice to connect the ends of mufflers to exhaust pipes by U-bolt connectors with a single clamping member which extends over the ends of the U-bolt and is held into engagement with the muffler end by a pair of nuts threaded on the opposite ends of such U-bolt. This conventional clamp connector has the disadvantages that there is no pivoting of such connector with the result that vibration due to travel of the truck or vehicle over roads is directly transmitted to the muffler connection causing it to loosen and eventually fail after a limited lifetime. This problem is avoided in the exhaust muffler support apparatus of the present invention by employing a pivot connection for pivotally connecting the bracket clamp members to one end of the support arm and by a vehicle mount for pivotally mounting the other end of such support arm on the body of the vehicle. In addition, the present invention provides an improved shock absorber mounting, including a sleeve of elastomer material which surrounds the mounting shaft attaching the opposite end of the support arm to the vehicle body thereby providing a simple and effective means of reducing the vibration transmitted to the exhaust muffler support apparatus from the truck body and also reducing the resulting noise. Also, the vehicle mount is of a simple, strong and inexpensive construction, including a mounting plate and a pair of tab members formed integral therewith and bent outward to extend laterally to such plate. For a stronger muffler to exhaust pipe connection, the bracket is formed of two pairs of clamp members, each pair including two U-shaped clamp members of different length which are mounted to in a nested relationship to provide four contact areas spaced along the exhaust pipe.

SUMMARY OF THE INVENTION

It is therefore one object of the present invention to provide an improved exhaust muffler support apparatus which is of longer useful lifetime and which greatly reduces the amount of vibration transmitted from the vehicle body to the muffler and also reduces noise.

Another object of the present invention is to provide such an exhaust muffler support apparatus which includes a bracket having at least two clamp members which are secured by a pivot connection to one end of a support arm to reduce wear on the clamp connection between the muffler and exhaust pipe and increase their useful life.

A further object of the invention is to provide such an exhaust muffler support apparatus which also includes a pivotal vehicle mount for mounting the other end of the support arm to the vehicle body in order to further reduce wear of the exhaust muffler support apparatus and to reduce vibration of the muffler connection.

An additional object of the invention is to provide such an exhaust muffler support apparatus with an improved bracket, including two pairs of clamp members of different length and mounted in a nested relationship, for clamping the muffler to the exhaust pipe with greater force at four contact areas spaced along such exhaust pipe to provide a stronger connection between the muffler and the exhaust pipe.

Still another object of the present invention is to provide such an improved exhaust muffler support apparatus in which the vehicle mount is of a simple, strong and inexpensive construction, including a mounting plate and a pair of tab members formed integral with such plate and bent outward to extend laterally therefrom and to receive a mounting shaft pivotally connected to the other end of the support arm.

A still further object of the present invention is to provide such an improved exhaust muffler support apparatus with a shock absorber sleeve of elastomer material which surrounds the mounting shaft of the mounting device for mounting the support arm on the body of the vehicle in order to reduce vibration transmitted from being transmitted from the vehicle body to the muffler connection.

BRIEF DESCRIPTION OF THE DRAWINGS

Other objects and advantages of the present invention will be apparent from the following detailed description of certain preferred embodiments thereof and from the attached drawings of which.

DESCRIPTION OF THE PREFERRED EMBODIMENTS

Figure 1:
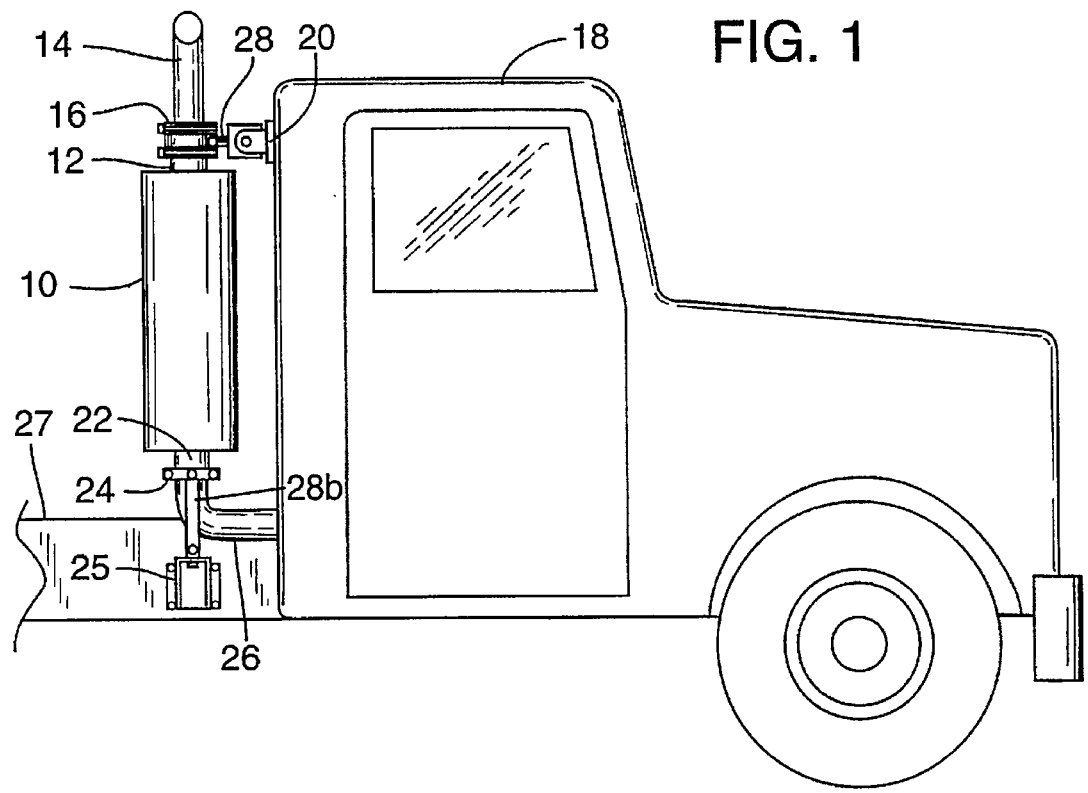
FIG. 1 is a side elevation view of a truck cab having a muffler mounted vertically on such cab and connected to the engine exhaust pipe of such truck by the exhaust muffler support apparatus of the present invention.
Figure 5:
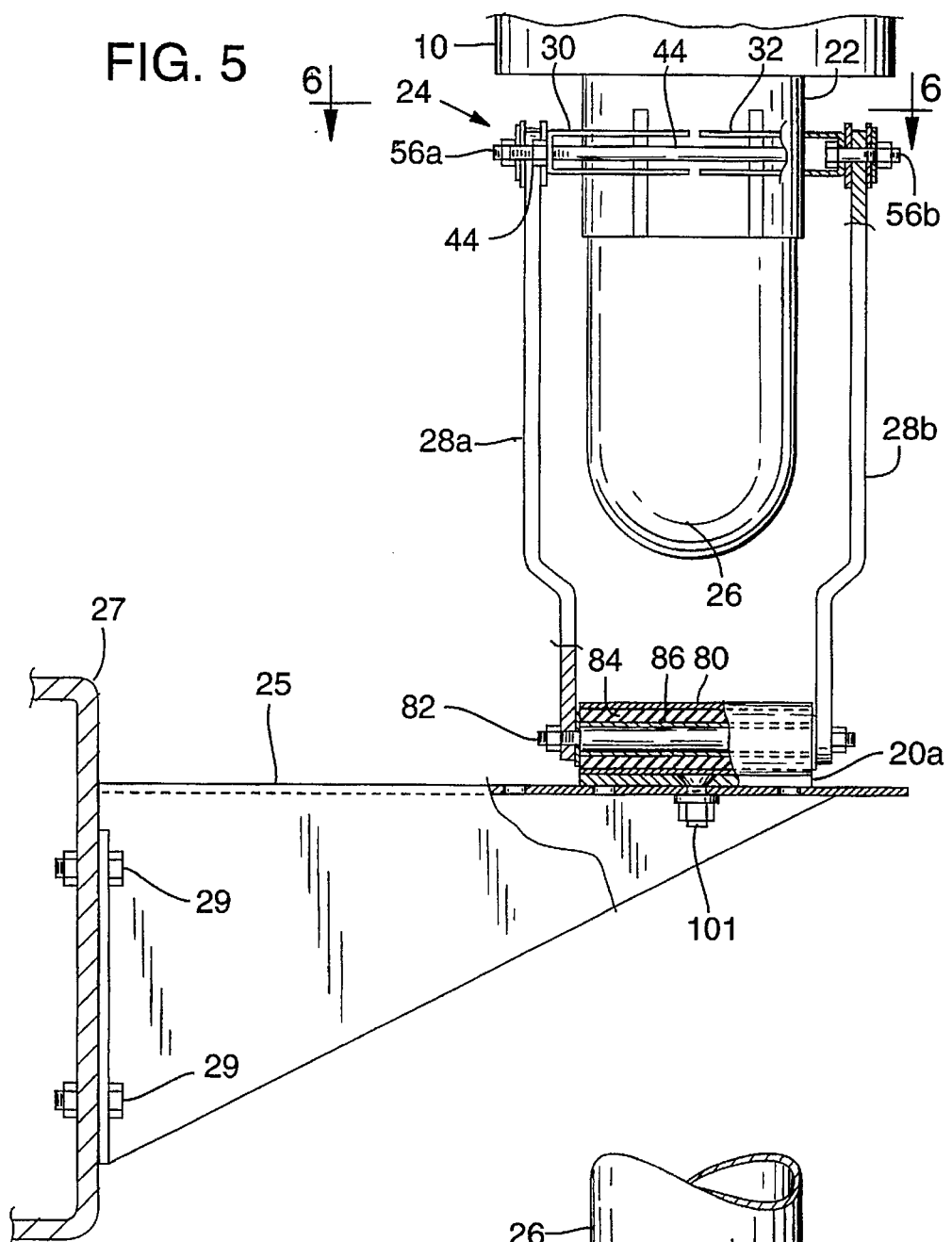
FIG. 5 is an enlarged rear view of the lower muffler mounting bracket apparatus of FIG. 1.
Figure 6:
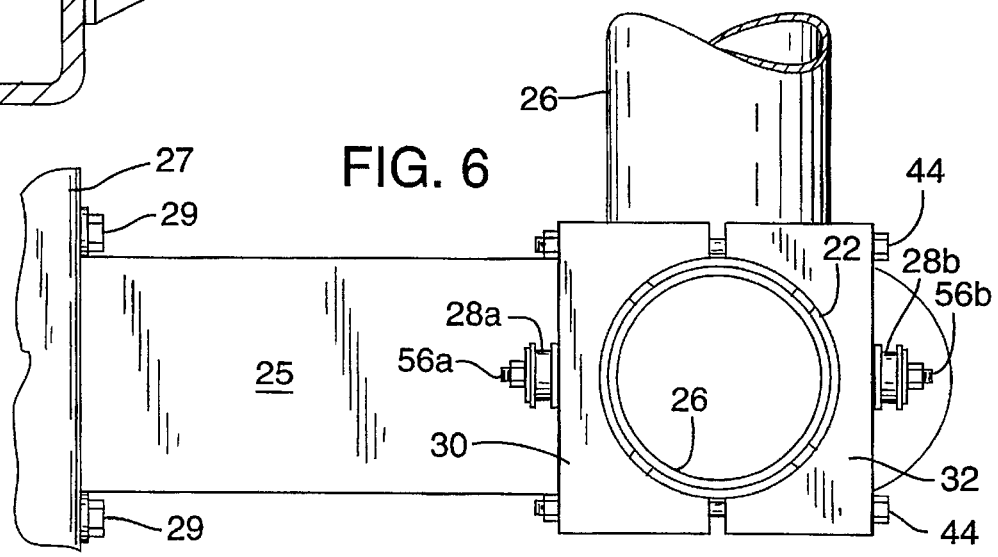
FIG. 6 is a top view of the lower bracket of FIG. 5.

The present invention relates to an exhaust muffler bracket apparatus for connecting a muffler 10 to an exhaust pipe of a motor vehicle, such as a truck, and for mounting such muffler on such vehicle, such as shown in FIG. 1. The exhaust muffler 10 has its outlet 12 secured to an exhaust pipe 14 by an upper bracket 16 made in accordance with the present invention, which is secured to the rear of the truck cab 18 by a vehicle mounting plate 20 which is bolted to such cab. The muffler 10 is mounted with its longitudinal axis extending vertically and its inlet end 22 connected by a lower bracket 24 to an L-shaped tailpipe section 26 which extends forward to the engine of such truck. The lower bracket 24 is connected by a triangular mounting member 25 to the side of a truck frame rail 27 with bolts 29. A support arm 28 connects the upper bracket 16 to its mounting plate 20 in the manner shown and described in FIGS. 2 and 3. Similarly, two support arms 28A and 28B connect the lower bracket 24 to its mounting member 25 as shown in FIGS. 5 and 6. Alternatively, the lower bracket 24 may be replaced by a conventional U-bolt bracket attached by a single support arm to the mounting member 25.

Figure 2:
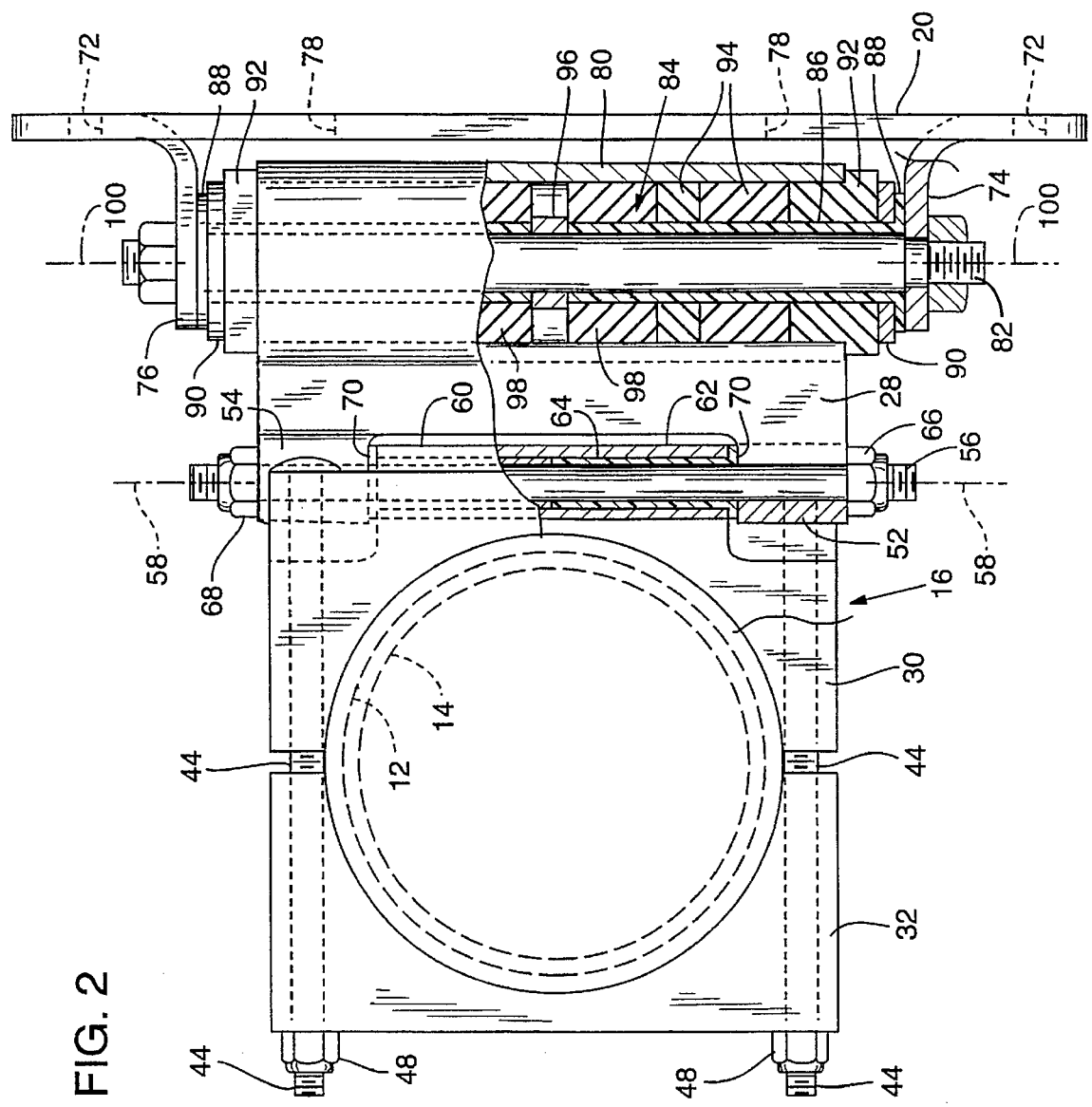
FIG. 2 is an enlarged end view of the upper muffler support bracket apparatus which secures the outlet at the top end of the muffler to the exhaust pipe in the embodiment of FIG. 1.
Figure 3:
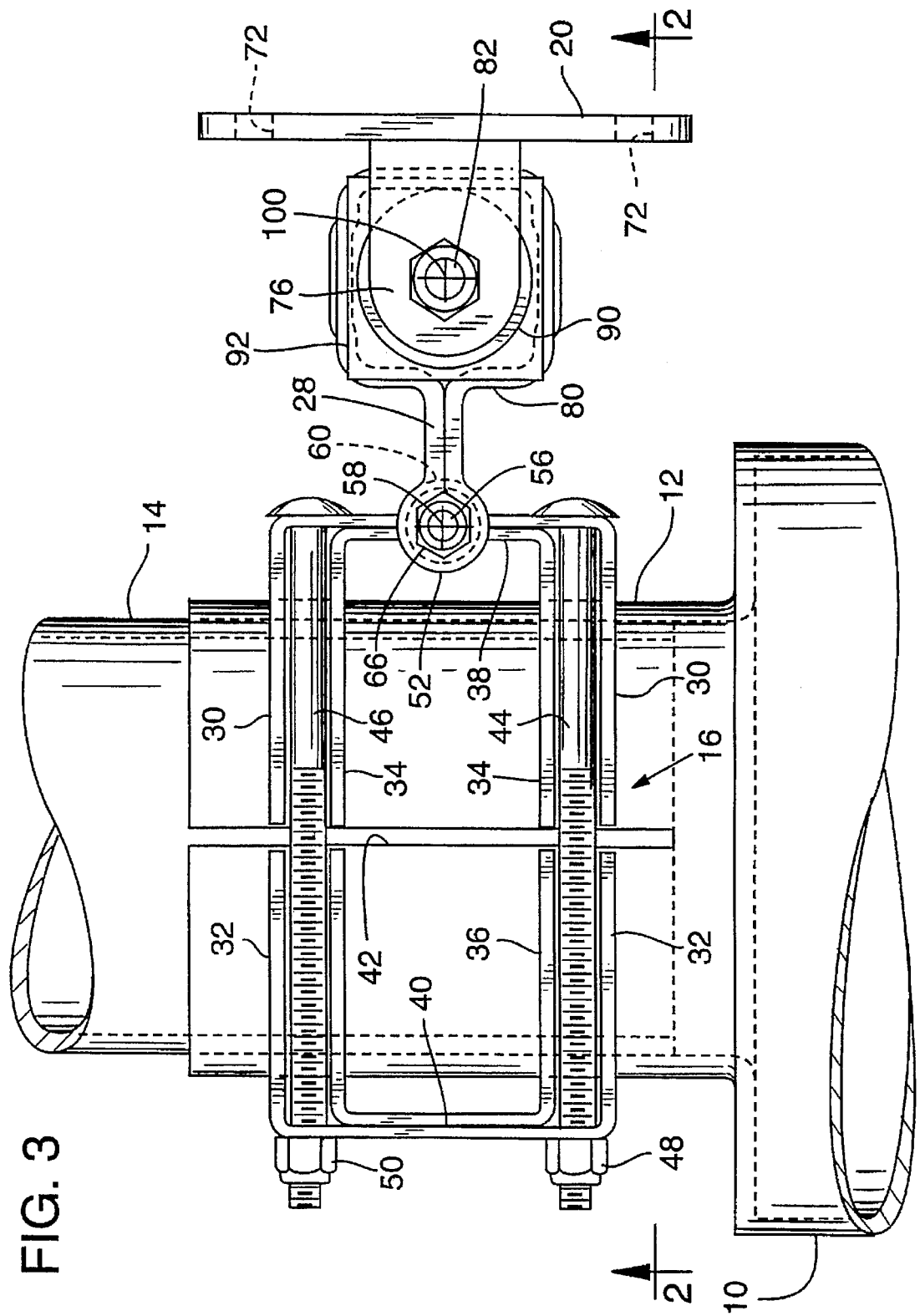
FIG. 3 is a side elevational view taken along line 3—3 of FIG. 2 showing the two pairs of clamp members forming the support bracket and the pivot connections to the support arm for such clamp members and the vehicle mount.

As shown in FIGS. 2 and 3, the upper mounting bracket 16 includes a first pair of clamp members 30, 32 of U-shaped cross-section which are fixed to a second pair of U-shaped clamp members 34, 36 nested within such first clamp members such as by welding them together at the bottom portions 38, 40 of the U-shaped members, where the first clamp members contact the second clamp members. Thus, the length of the second clamp members 34, 36 is less than the length of the first clamp members 30, 32 so that the legs of such clamp members contact the outlet end 12 of the muffler 10 at four different positions spaced longitudinally apart along the axis of such muffler, as shown in FIG. 3. This four contact clamping provides a stronger clamp connection between the muffler outlet 12 and the exhaust pipe 14. It should be noted that both the muffler outlet 12 and inlet 22 are provided with a split end made of several end sections separated by narrow gaps 42 to allow such split end sections to be bent inwardly by the clamp members during clamping for more secure engagement with the exhaust pipe.

A pair of bolts 44, 46 or other threaded fasteners are provided through holes in the first clamp members 30, 32 at each end of the clamp bracket. Nuts 48, 50 are provided over the threaded ends of the bolts 44, 46, respectively, for urging the outer clamp members 32 and 36 toward the inner clamp members 30 and 34 when such nuts are tightened. This causes the bracket 16 to clamp the outlet end 12 of the muffler onto the exhaust pipe 14.

As shown in FIGS. 2 and 3, the support arm 28 is formed of two similar arm members welded together to provide a pair of hinge portions 52, 54 on one end of such support arm at the opposite sides of such support arm. The hinge portions are connected by a connector shaft 56 to the inner clamp members 30 and 34 to enable the bracket 16 to pivot on the connector shaft 56 about a first pivot axis 58. The inner clamp members 30 and 34 are provided with a connector portion 60 in the shape of a sleeve 62 which surrounds the connector shaft 56 and is positioned between the two hinge portions 52, 54 of the support arm 28. A bushing or bearing sleeve 64 of nylon or other low friction plastic material is provided between the connector sleeve 62 and the connector shaft 56 to reduce friction. A pair of fastening nuts 66, 68 are secured at the opposite ends of the connector shaft 56 to secure such shaft to the hinge portions 52, 54. It should be noted that nuts 66, 68, 48 and 50 are all lock nuts of a conventional type. Also, the bushing or bearing sleeve 64 is preferably made in two pieces, each having a flange portion 70 on its outer end which engages the opposite end of the connector sleeve 62 to space it from one of the hinge portions 52, 54.

The vehicle mount, including the mounting plate 20, is provided with a plurality of bolt holes 72 for mounting bolts to attach such plate to the truck cab. The mounting plate 20 is provided with a pair of tab portions 74, 76 formed by cutting the mounting plate with a suitable punch at apertures 78 and bending the tab portions upward so that they extend laterally from the outer surface of the mounting plate 20, as shown in FIG. 2. Thus, the tab portion 74, 76 extend outward from D-shaped apertures 78 in the mounting plate 20 formed by the U-shaped cut of the punch, after the tab portions are bent outwardly into the position shown in FIGS. 2 and 3.

The other end of the support arm 28 is formed with a mounting sleeve portion 80 of a generally rectangular shape which surrounds a mounting shaft 82 and is separated therefrom by a shock absorber sleeve 84 of rubber or elastomer material which may be formed as two sleeve portions each including a plurality of rectangular rubber plugs 94 having a central aperture of a circular shape with a diameter slightly greater than that of the mounting shaft 82. The shock absorber sleeve 84 surrounds a bushing or bearing sleeve of nylon or other low friction plastic material 86. The bushing 86 is provided with an outer flange portion 88 which is secured between the tab portion 74 or 76 and a metal washer 90 surrounding the plastic bushing and separating the flange 82 from the first rubber plug 92 of the elastomer sleeve 84. A metal partition ring 96 is provided on the mounting shaft 88 to separate the two bushing sleeves 86 from each other and to separate the inner most rubber plug 98 of the elastomer sleeve 84 from that of the adjacent elastomer sleeve portion, as shown in FIG. 2. As a result, the support arm 28 pivots about a second pivot axis 100 which extends longitudinally through the center of the mounting shaft 82.

As shown in FIGS. 5 and 6, the lower bracket 24 is similar to the upper bracket 16 so that the same reference numbers have been used for like parts. However, the lower bracket employs a single pair of clamp members 30, 32 which are urged together by a single pair of adjustment bolts 44 to clamp the inlet end 22 of the muffler to the tailpipe section 26. Of course, two pairs of clamp members may be employed for the lower bracket as well, if necessary. Also, a pair of support arms 28A and 28B connected to two pivot connections 56A and 56B, respectively, to the clamp members 30 and 32, are employed to support the lower bracket 24 on the opposite ends of the mounting shaft 82 of a modified shock absorber mount. The outer sleeve 80 of the shock absorber mount is fixed by welding or the like to a modified mounting plate 20A which is fastened by a bolt and nut connection 101 to the triangular mounting member 25. Thus, the lower bracket 24 is mounted to pivot sideways, forward, and backward about two axes including the axis of pivot connections 56A, 56B and the axis of shaft 82.

Figure 4:
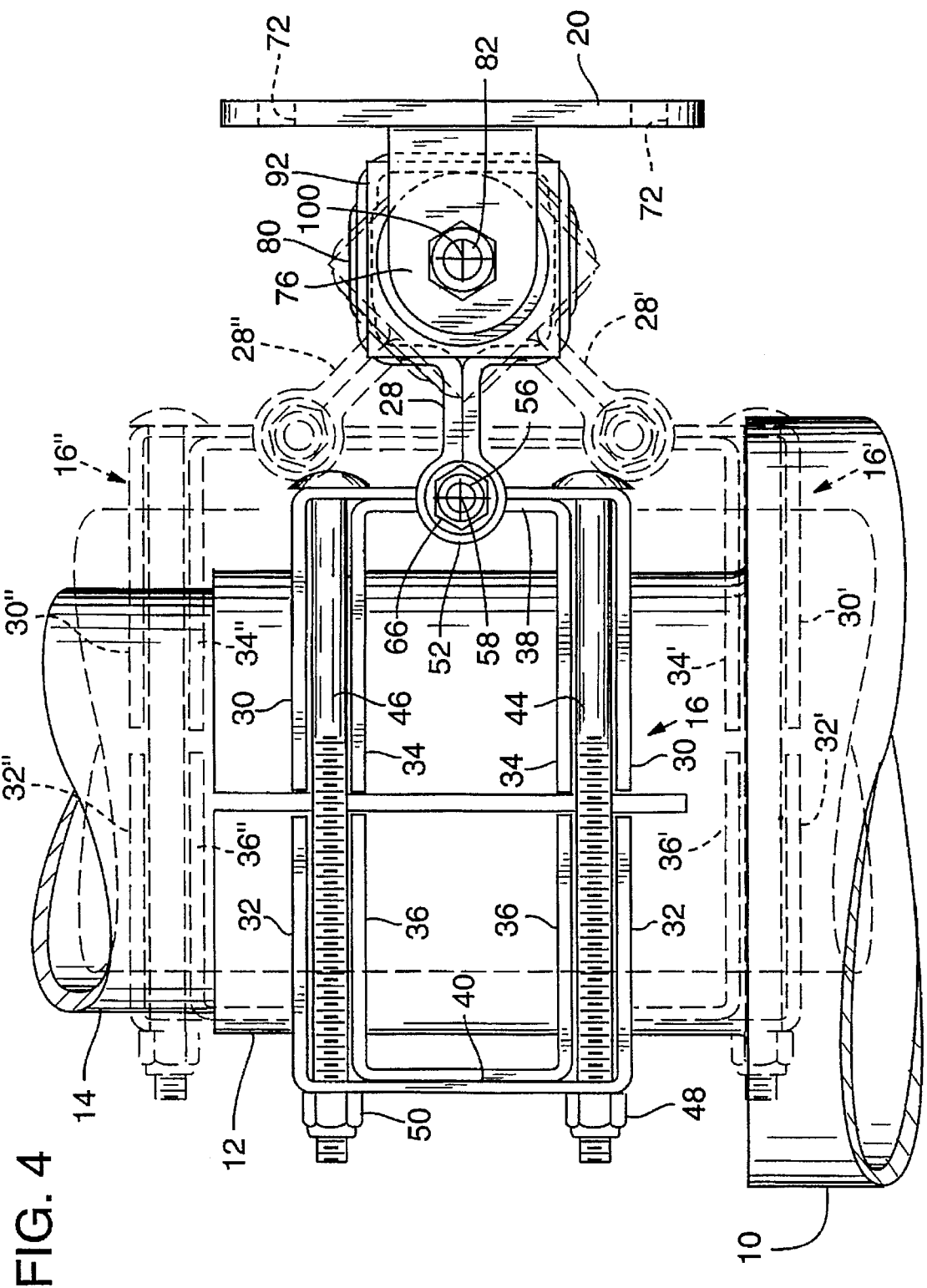
FIG. 4 is a side view of the muffler support apparatus of FIGS. 1-3 showing the vertical movement of the muffler bracket due to vibration of the muffler by the truck which is enabled by the two pivot connections at the opposite ends of the support arm.

Because of the pivot connection 56, 58 and the pivot mount 82, 100, as well as the shock absorber sleeve 84, the muffler bracket 16 of the present invention is able to move up and down from the solid line position 16 shown in FIG. 4 between the lower position 16' shown in dashed lines and the upper position 16" shown in dashed lines relative to the truck cab 18 of FIG. 1 during its travels. However, the lower bracket 24 and mounting member 25 secure the muffler to the frame 27 so that the up and down movement of such muffler is limited and some side-to-side or forward and backward movement of the muffler about axes 56A, 56B and 82 is permitted. As a result, the muffler bracket and the connections between the muffler and the tailpipes 14 and 26 are of much longer useful lifetime. In addition, the noise caused by vibration of the muffler is greatly reduced because of the shock absorber material in sleeve 84.

Figure 7:
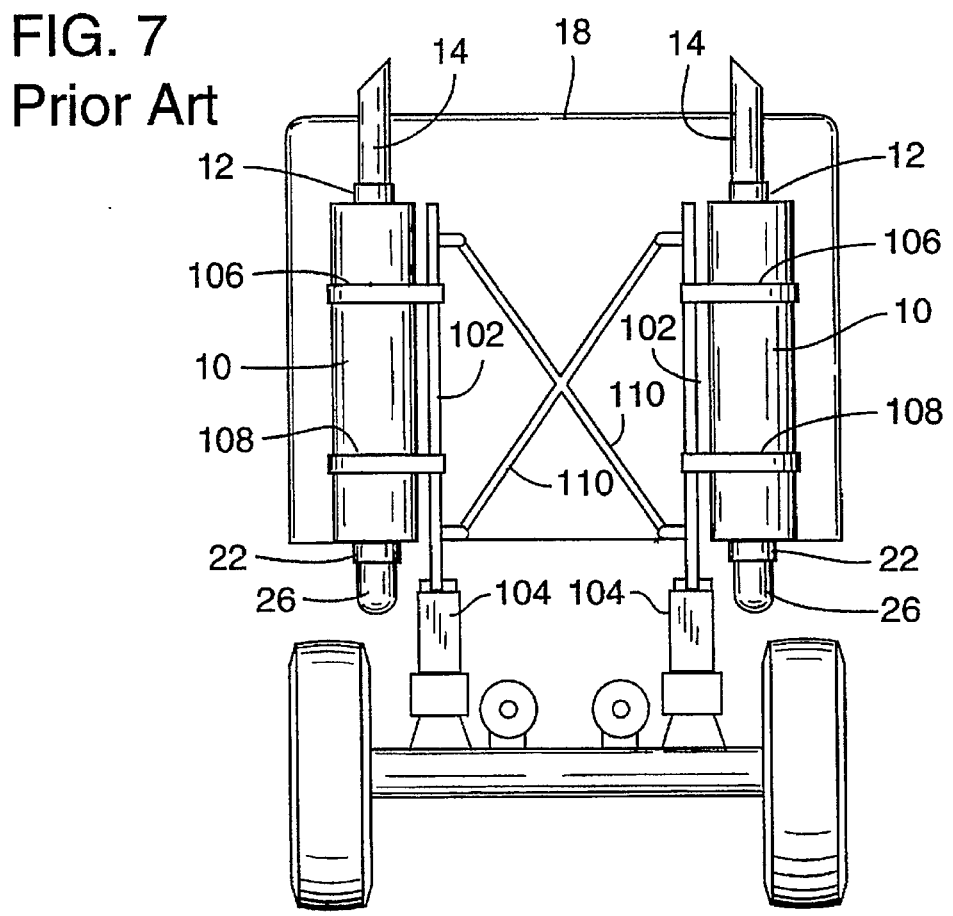
FIG. 7 is a rear view of a prior art muffler support apparatus attached to the back of a truck cab by support braces secured to the muffler body and truck frame.

In contrast, a conventional prior art muffler support system shown in FIG. 7, includes vertical metal support arms 102 which are rigidly connected to the frame 104 of the truck and are secured by clamp rings 106, 108 directly around the muffler body of two mufflers 10 for fastening such mufflers to the support arms 102. Cross braces 110 are provided between the two support arms 102 to provide a X-shaped support of greater rigidity as shown in FIG. 7. In this prior art device, the exhaust pipe 14 is connected to the muffler outlet 12 by a conventional connector, such as a U-bolt, as is the inlet 22 of such muffler connected to the L-shaped tailpipe 26. As a result in the prior art construction, the movement of the truck frame 104 is directly transmitted to the muffler 10 through the support arm 102 which causes vibration of the muffler to weaken the clamp rings 106, 108 and the connections between the exhaust pipes 14, 26 and the muffler connectors 12 and 22, respectively, thereby greatly reducing their useful lifetime. In addition, more noise is created due to the vibration of the muffler. These problems are avoided by the muffler bracket support apparatus of the present invention.

It will be apparent to those having ordinary skill in the art that many changes may be made in the above-described preferred embodiment of the present invention. For example, the single support arm 28 can be replaced by two spaced support arms secured to the tabs 74, 76, respectively. Therefore, the scope of the present invention should be determined by the following claims.

I claim:

1. Exhaust muffler apparatus, comprising:
    an engine exhaust muffler;
    a bracket with a clamp having at least two clamp members for clamping the muffler to an engine exhaust pipe so that the muffler and exhaust pipe are fixed relative to said clamp;
    pivot connection for pivotally connecting said bracket to at least one support arm to enable pivoting of said bracket relative to said support arm; and
    a vehicle mount including a mounting plate adapted to be mounted on a motor vehicle and having a pair of tab members fixed to said plate and extending laterally therefrom, and a mounting shaft extending between said tab members for pivotal mounting of said support arm on said mounting plate to support said bracket on a vehicle body.

2. Apparatus in accordance with claim 1 in which the tab members are formed integral with said mounting plate and bent to extend laterally therefrom.

3. Apparatus in accordance with claim 2 in which the mount includes a resilient shock absorber member.

4. Apparatus in accordance with claim 3 in which the shock absorber member is a sleeve of elastomer material which surrounds said mounting shaft and extends between said pair of tab members.

5. Apparatus in accordance with claim 4 in which the vehicle mount includes mounting tube containing said shock absorber sleeve and said mounting shaft, and said sleeve being formed of a plurality of resilient plugs spaced along said mounting shaft.

6. Apparatus in accordance with claim 5 in which the mount includes a bushing sleeve between the shock absorber sleeve and the mounting shaft, and the mounting tube is formed as an integral member with one end of the support arm.

7. Truck exhaust muffler apparatus, comprising:
    an engine exhaust muffler;
    a bracket for clamping the muffler to a truck engine exhaust pipe, including at least one pair of clamp members and associated threaded fasteners for urging said pair of clamp members to a clamping position by adjustment of said fasteners to clamp the muffler to the exhaust pipe;
    pivot connection means for pivotally connecting one of said pair of clamp members to one end of a support arm to enable pivoting of said clamp members relative to said support arm about a first pivot axis; and
    a vehicle mount including a mounting plate and a pair of tab portions fixed to said plate and extending laterally thereto which are pivotally connected by a mounting shaft to the other end of said support arm, said plate being adapted to be mounted on a truck body to enable pivoting of said support arm relative to said truck body on said tab portions about a second pivot axis.

8. Apparatus in accordance with claim 7 in which the support arm is provided with a pair of hinge portions on the opposite sides of one end of said support arm, which engage a connector shaft extending through a connector portion of said one clamp member to provide said pivot connection.

9. Apparatus in accordance with claim 7 in which the muffler is mounted on the truck with its longitudinal axis in a substantially vertical position and said pair of clamp members engages the outlet at the top of the muffler.

10. Apparatus in accordance with claim 9 in which the clamping means also includes a second pair of top clamp members, each attached to a different one of said one pair of clamp members, and two threaded fasteners securing the first and second pairs of members together.

11. Apparatus in accordance with claim 7 in which the vehicle mount includes means includes a pivotal mount having a resilient shock absorber sleeve of elastomer material surrounding the mounting shaft attached to the pair of bracket arms and between the tab portions to enable said support arm to pivot on said mounting shaft.

12. Apparatus in accordance with claim 11 in which the vehicle mount includes a mounting tube containing said shock absorber sleeve and said mounting shaft with said mounting tube being secured to the mounting plate for attachment to the truck body.

13. Apparatus in accordance with claim 12 which also includes a bushing sleeve of plastic material between the shock absorber sleeve and the mounting shaft.

14. Apparatus in accordance with claim 7 in which the bracket includes a second pair of clamp members each attached to a different one of said one pair of clamp members, said one clamp member and said second clamp member both being of U-shaped cross-section but being of different widths to engage the muffler connector pipe at different positions along its length.

15. Apparatus in accordance with claim 7 in which the clamp members are each of a U-shaped cross-section and the threaded fasteners are bolts which extend between the opposite sides of each U-shaped clamp portions and adjustably secure the pair of clamp members together.

16. Exhaust muffler apparatus, comprising:
    an engine exhaust muffler;

a clamp having rigid clamp members adapted for clamping a muffler to an engine exhaust pipe between said clamp members so that the muffler and exhaust pipe are fixed relative to the clamp, including at least one pair of clamp members and associated threaded fasteners for urging said pair of clamp members into a clamping position by adjustment of said fasteners to clamp a muffler connector to an exhaust pipe;

a pair of spaced bracket arms;

a pair of pivotal connectors for pivotally connecting said pair of clamp members to said spaced bracket arms to enable pivoting of said clamp members relative to said bracket ares; and a mount adapted to be attached to a motor vehicle for mounting said pair of bracket arms on a vehicle body to support said clamp on said vehicle body.

17. Apparatus in accordance with claim 16 in which the mount includes a pivotal mount which is pivotally connected to a mounting member adapted to be attached to the vehicle body.

18. Apparatus in accordance with claim 17 in which the pivotal mount includes a pair of pivot end portions at the inner ends of the pair of bracket arms which are secured to the vehicle body, said pair of pivot end portions having a common first pivot axis about which said bracket arms may pivot, and a spacer member which is connected between the bracket arms to space said bracket arms apart.

19. Apparatus in accordance with claim 16 in which the pair of pivotal connectors each connects a different one of the pair of clamp members to a different one of said pair of bracket arms with a pivotal connection, said pair of pivotal connectors having a common pivot axis about which the clamp members are pivoted.

20. Apparatus in accordance with claim 16 in which the clamp members are each of a U-shaped cross-section and the threaded fasteners are bolts which extend between the opposite sides of each U-shaped clamp member and adjustably secure the pair of clamp members together.

21. Apparatus in accordance with claim 20 in which the clamp includes a second pair of clamp members each secured to a different one of said one pair of clamp members for movement therewith in response to clamping adjustment by the threaded fasteners so that the muffler connector is clamped to the exhaust pipe by the two pairs of clamp members at different positions spaced longitudinally along said pipe.

\* \* \* \* \*